United States Patent
O'Neill

(10) Patent No.: US 11,513,558 B2
(45) Date of Patent: Nov. 29, 2022

(54) CONNECTORS FOR MOBILE ELECTRONIC DEVICES

(71) Applicant: Patrick D. O'Neill, Huntington Beach, CA (US)

(72) Inventor: Patrick D. O'Neill, Huntington Beach, CA (US)

(73) Assignee: Patricko, LLC, Huntington Beach, CA (US)

( * ) Notice: Subject to any disclaimer, the term of this patent is extended or adjusted under 35 U.S.C. 154(b) by 136 days.

(21) Appl. No.: 16/905,602

(22) Filed: Jun. 18, 2020

(65) Prior Publication Data

US 2021/0004050 A1 Jan. 7, 2021

Related U.S. Application Data

(60) Provisional application No. 62/934,443, filed on Nov. 12, 2019, provisional application No. 62/877,221, (Continued)

(51) Int. Cl.
| | |
|---|---|
| *G06F 1/16* | (2006.01) |
| *A45F 5/00* | (2006.01) |
| *H02J 7/00* | (2006.01) |

(52) U.S. Cl.
CPC .............. *G06F 1/1632* (2013.01); *A45F 5/00* (2013.01); *H02J 7/0044* (2013.01)

(58) Field of Classification Search
CPC ...... A45F 5/00; A45F 5/02; A45F 2200/0516; A45F 2005/023; A45F 5/021; G06F 1/1632; H02J 7/0044; H04M 1/0258
See application file for complete search history.

(56) References Cited

U.S. PATENT DOCUMENTS

| | | |
|---|---|---|
| 1,649,655 A | 11/1927 | Benson |
| 2,461,201 A | 2/1949 | Ellis |
| | (Continued) | |

*Primary Examiner* — Robert Sandy
*Assistant Examiner* — Louis A Mercado
(74) *Attorney, Agent, or Firm* — Knobbe Martens Olson & Bear, LLP

(57) ABSTRACT

A connector can be provided for attaching to a mobile electronic device which can have a cap portion, a protrusion extending distally from a bottom of the cap portion, the protrusion being configured to be attachable to an electronic port of a mobile electronic device. The cap portion can be configured to be sized and shaped so that, when the cap portion is attached to the mobile electronic device, the cap portion extends further in the distal direction along front and rear surfaces of the mobile electronic device than along a proximal surface of the mobile electronic device. A connector can be provided with a cap having a height and a width, the height of the cap being greater than the width of the cap, the cap having a proximal curved surface and a distal curved surface, and a protrusion extending distally from the cap, the protrusion being configured to be insertable within a port of the mobile electronic device such and to resist withdrawal from the port. A connector can be configured to be attachable to a mobile electronic device. The connector can include a cap with a proximal continuously curved surface, and a protrusion extending distally from the cap, the protrusion having front and rear surfaces, the protrusion being configured to be insertable within a port of the mobile electronic device such and to resist withdrawal from the port, wherein at least a majority of the curved surface of the cap is oblique to the front and rear surfaces of the protrusion.

15 Claims, 18 Drawing Sheets

Related U.S. Application Data filed on Jul. 22, 2019, provisional application No. 62/865,014, filed on Jun. 21, 2019.

(56) References Cited

U.S. PATENT DOCUMENTS

| | | | |
|---|---|---|---|
| D234,946 S | 4/1975 | Fredriksson et al. | |
| D244,585 S | 6/1977 | Jonsson | |
| D348,214 S | 6/1994 | Girardin | |
| D474,736 S * | 5/2003 | Sagawa | D13/108 |
| D475,591 S | 6/2003 | Luquire | |
| D477,604 S | 7/2003 | Lin | |
| 6,597,577 B1 | 7/2003 | Tang et al. | |
| D499,545 S | 12/2004 | Condiff | |
| 7,014,486 B1 * | 3/2006 | Wu | H04M 1/04 |
| | | | 439/165 |
| D518,950 S | 4/2006 | Condiff | |
| D525,581 S | 7/2006 | Rad et al. | |
| D527,723 S | 9/2006 | Andre et al. | |
| D537,074 S | 2/2007 | Andre et al. | |
| D577,008 S * | 9/2008 | Andre | D13/133 |
| 7,594,305 B2 | 9/2009 | Moore | |
| D608,187 S | 1/2010 | Baron | |
| 7,650,007 B2 | 1/2010 | Iuliis et al. | |
| D612,856 S | 3/2010 | Wahl et al. | |
| D625,988 S | 10/2010 | Chan | |
| 8,208,978 B2 | 6/2012 | Stiehl et al. | |
| D672,780 S | 12/2012 | Chen et al. | |
| D684,539 S | 6/2013 | Akana et al. | |
| D703,671 S | 4/2014 | Hackett et al. | |
| 8,721,356 B2 * | 5/2014 | Webb | F16C 11/12 |
| | | | 439/248 |
| D709,504 S | 7/2014 | Breines | |
| 8,780,547 B2 * | 7/2014 | Nakanishi | G03B 29/00 |
| | | | 361/679.41 |
| D724,311 S | 3/2015 | Treska | |
| D727,868 S | 4/2015 | O'Neill et al. | |
| 9,164,543 B2 | 10/2015 | Minn et al. | |
| D745,377 S | 12/2015 | Ressler et al. | |
| D750,822 S | 3/2016 | Hernandez et al. | |
| D756,986 S | 5/2016 | O'Neill et al. | |
| D757,513 S | 5/2016 | Heins | |
| D758,307 S | 6/2016 | Stump et al. | |
| D763,852 S | 8/2016 | Avganim | |
| D773,911 S | 12/2016 | Louis | |
| D809,370 S | 2/2018 | Tang | |
| 9,936,793 B2 * | 4/2018 | Grossman | A45F 5/00 |
| D821,393 S | 6/2018 | Matsumiya et al. | |
| 9,999,292 B1 | 6/2018 | Rainsong | |
| D844,782 S | 4/2019 | Arora | |
| D846,502 S | 4/2019 | Akana et al. | |
| D850,227 S | 6/2019 | Spater | |
| D853,396 S | 7/2019 | Kong et al. | |
| D865,494 S | 11/2019 | Adelman | |
| D882,579 S * | 4/2020 | O'Neill | D14/433 |
| 2009/0158899 A1 | 6/2009 | Eisenbraun | |
| 2011/0226823 A1 | 9/2011 | Jasa | |
| 2017/0251088 A1 | 8/2017 | Rosales | |

* cited by examiner

CONNECTORS FOR MOBILE ELECTRONIC DEVICES

RELATED APPLICATIONS

This application claims the benefit under 35 U.S.C. § 119(e) of U.S. Provisional Patent Application No. 62/865,014, filed on Jun. 21, 2019, U.S. Provisional Patent Application No. 62/877,221, filed on Jul. 22, 2019, and U.S. Provisional Patent Application No. 62/934,443, filed on Nov. 12, 2019, the entire contents of all of which are hereby incorporated by reference herein and made part of this specification for all that they disclose.

BACKGROUND

Field

This disclosure relates generally to accessories for mobile electronic devices and specifically to connectors to aid in securing, holding, or carrying mobile electronic devices.

Description of the Related Art

In recent years, electronic innovations have provided a multitude of different types of mobile electronic devices for consumers, professionals, and businesses, including mobile telephones, mobile audio devices (e.g., wired or wireless earphones and/or microphones), mobile gaming devices, mobile electronic storage devices (e.g., configured to store music, photos, or other data), mobile cameras, mobile GPS devices, mobile inventory devices, mobile compact computers (e.g., computer tablets or laptops), mobile access actuators (e.g., electronic keys, or door or gate openers), mobile chargers, remote controls, mobile product scanners, mobile ticket-scanning devices, mobile identification devices, etc.

These devices may be expensive to purchase, may include sensitive and valuable data, and may be fragile and prone to damage if dropped. Also, these devices tend to be small and light in order to facilitate mobility, which make them easy to leave behind or lose during a person's daily activities.

SUMMARY

A connector can be provided for attaching to a mobile electronic device. In some embodiments, the connector can comprise a cap portion, a protrusion extending distally from a bottom of the cap portion, the protrusion being configured to be attachable to a mobile electronic device, such as at an electronic port of the mobile electronic device. The cap portion can be configured to be sized and shaped so that, when the cap portion is attached to the mobile electronic device, the cap portion extends further in the distal direction along front and rear surfaces of the mobile electronic device than along a proximal or top surface or edge of the mobile electronic device.

A connector can be provided with a cap having a height and a width, the height of the cap being greater than the width of the cap, the cap comprising a proximal curved surface and a distal curved surface, and a protrusion extending distally from the cap, the protrusion being configured to be insertable within a port of the mobile electronic device such as to resist withdrawal from the port.

A connector can be configured to be attachable to a mobile electronic device. The connector can include a cap with a proximal continuously curved surface, and a protrusion extending distally from the cap, the protrusion comprising front and rear surfaces, the protrusion being configured to be insertable within a port of the mobile electronic device such as to resist withdrawal from the port, wherein at least a majority of the curved surface of the cap is oblique to the front and rear surfaces of the protrusion.

Numerous other examples, features, structures, and methods are described in this specification and/or illustrated in the accompanying drawings.

DETAILED DESCRIPTION

Figure 1:
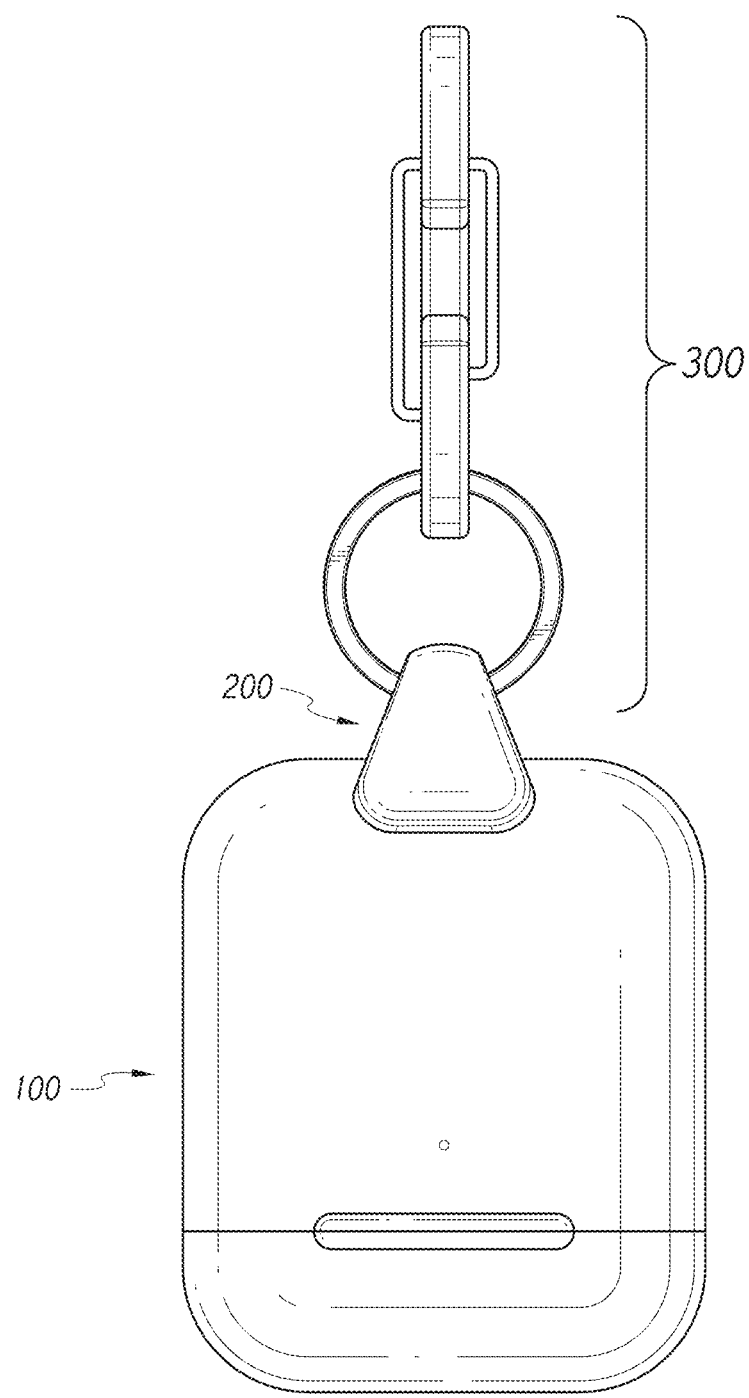
FIG. 1 is an illustration of a front plan view of an example of a mobile electronic device coupled with a connector which is in turn coupled with a holding or securing device.

This specification provides textual descriptions and illustrations of many devices. Any structure, material, function, method, or step that is described and/or illustrated in one example can be used by itself or with or instead of any structure, material, function, method or step that is described and/or illustrated in another example or used in this field.

The text and drawings merely provide examples and should not be interpreted as limiting or exclusive. No feature disclosed in this application is considered critical or indispensable. The relative sizes and proportions of the components illustrated in the drawings form part of the supporting disclosure of this specification, but should not be considered to limit any claim unless recited in such claim.

As illustrated in FIG. 1, a mobile electronic device 100 can be removably coupled with a connector 200, which can in turn be removably coupled with a holding or securing device 300. The illustrated example of a mobile electronic device 100 is a case and charger for a wireless earphone/microphone system sold commercially by Apple, Inc. under the trademark AirPods. Any other mobile electronic device can be used with a suitably configured connector, including any of the examples of mobile electronic devices mentioned in the background.

The holding or securing device 300 can be removably coupled with an item or placed in a position that aids in preventing or resisting damage or loss of the mobile electronic device 100. For example, in some embodiments, the holding or securing device 300 can be configured to be removably coupled to an item of clothing, such as a belt loop or button hole, or a strap of pants or a shirt, or on or in a personally carried item such as a backpack, purse, carrying case, or brief case, or in a storage location such as a wall-mounted or car-mounted holder. In some embodiments, when coupled in one or more of these ways, the mobile electronic device 100 can be generally closely accessible by a person, can resist or diminish the risk of damage to the mobile electronic device 100 from falling, and/or can resist or diminish the risk of loss of the mobile electronic device 100.

Figure 2:
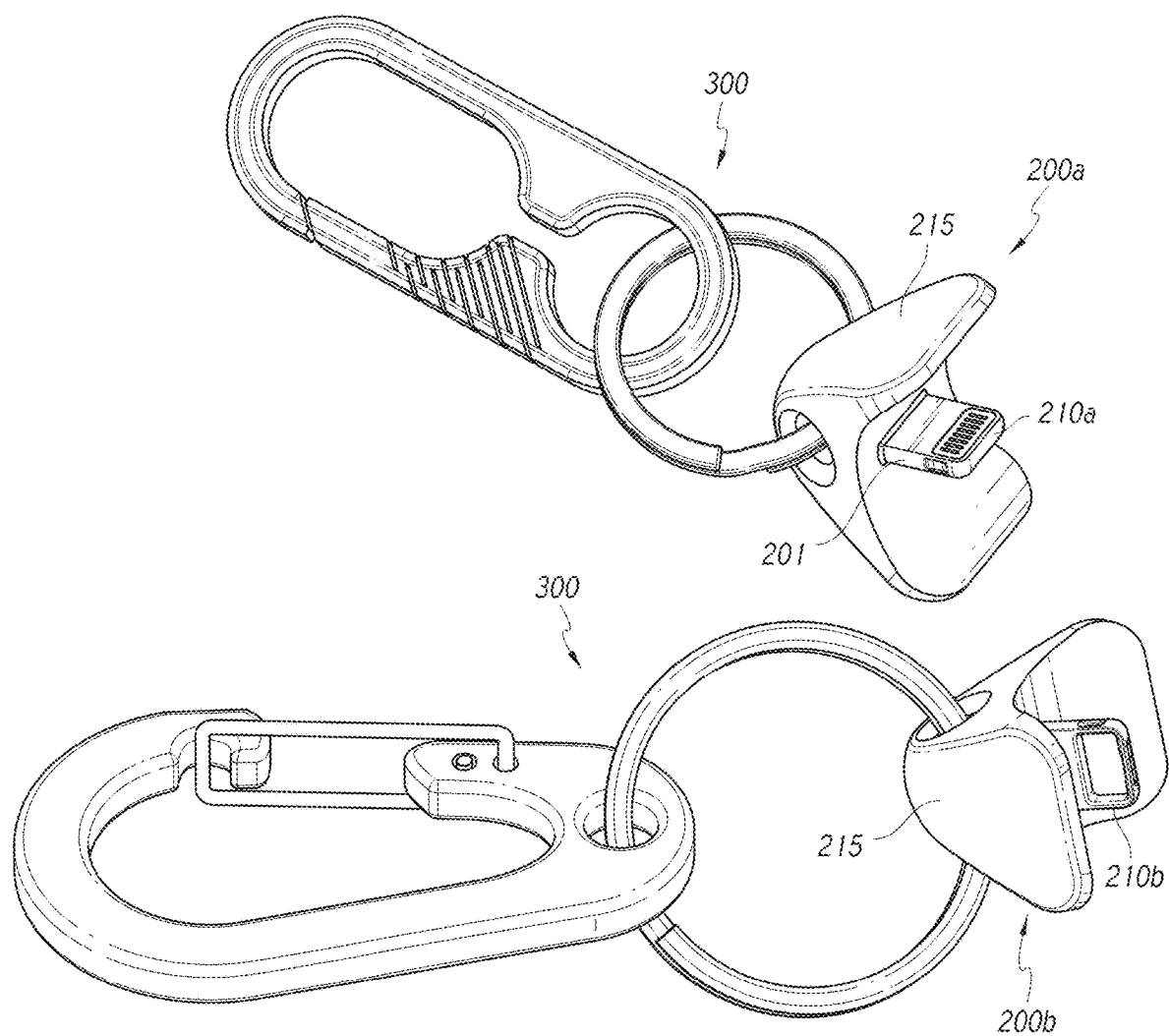
FIG. 2 is an illustration of a perspective view of two examples of holding or securing devices coupled to two examples of connectors 200.

As illustrated in FIG. 2, many different types of holding or securing devices 300 can be provided, including devices that comprise one or more rings and/or carabineers. These are merely examples. Any holding or securing device can be used. As shown, the holding or securing devices 300 can be separable and removable from the connector 200. In some embodiments, the holding or securing devices 300 can be integral, unitary, and/or non-removable from the connector 200. As shown in FIG. 2, many different types of connectors 200a, 200b can be provided, including connectors 200a, 200b with different types of distal protrusions 210a, 210b.

Figure 3:
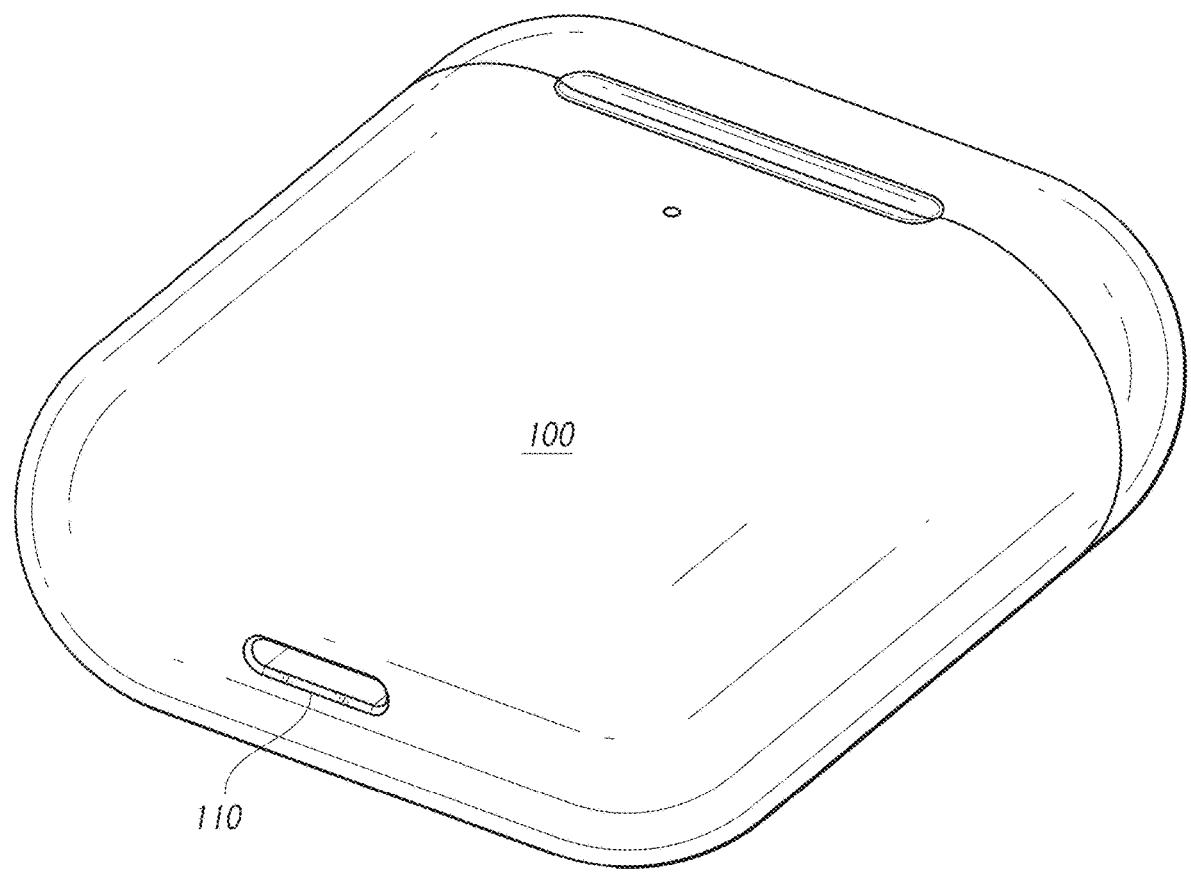
FIG. 3 is an illustration of a perspective view of an example of a mobile electronic device with an electronic port.

As illustrated in FIG. 3, the mobile electronic device 100 has an access or securing region in the form of an electronic port 110. Many other types of access or securing regions exist or can be provided in mobile electronic devices 100, including one or more grooves, edges, corners, curves, protrusions, recesses, holes, etc. Some access or securing regions have one or more other functions, such as to provide an electronic connection (as with electronic port 110), and some access or securing regions may not have one or more other functions. The electronic port 110 of the illustrated mobile electronic device 100 is a port configured to receive an end of a wire commercially known as a Lightning connector. The illustrated electronic port 110 has a generally narrow opening with a width that is substantially larger than its height. Any other suitable shape can be used. Other examples of electronic connector ports that are suitable for use as an access or securing region can be a port for a USB connector (including USB-C), a port for a charging wire, a port for a speaker or microphone jack, a port for an RCA cable, etc. Any other type of electrical port or non-electrical port or opening can be used as an access or securing region on the mobile electronic device 100. In some embodiments, as shown, the access or securing region is on the mobile electronic device itself without including an external protective or utility case that may otherwise form part of the mobile electronic device.

Figure 4:
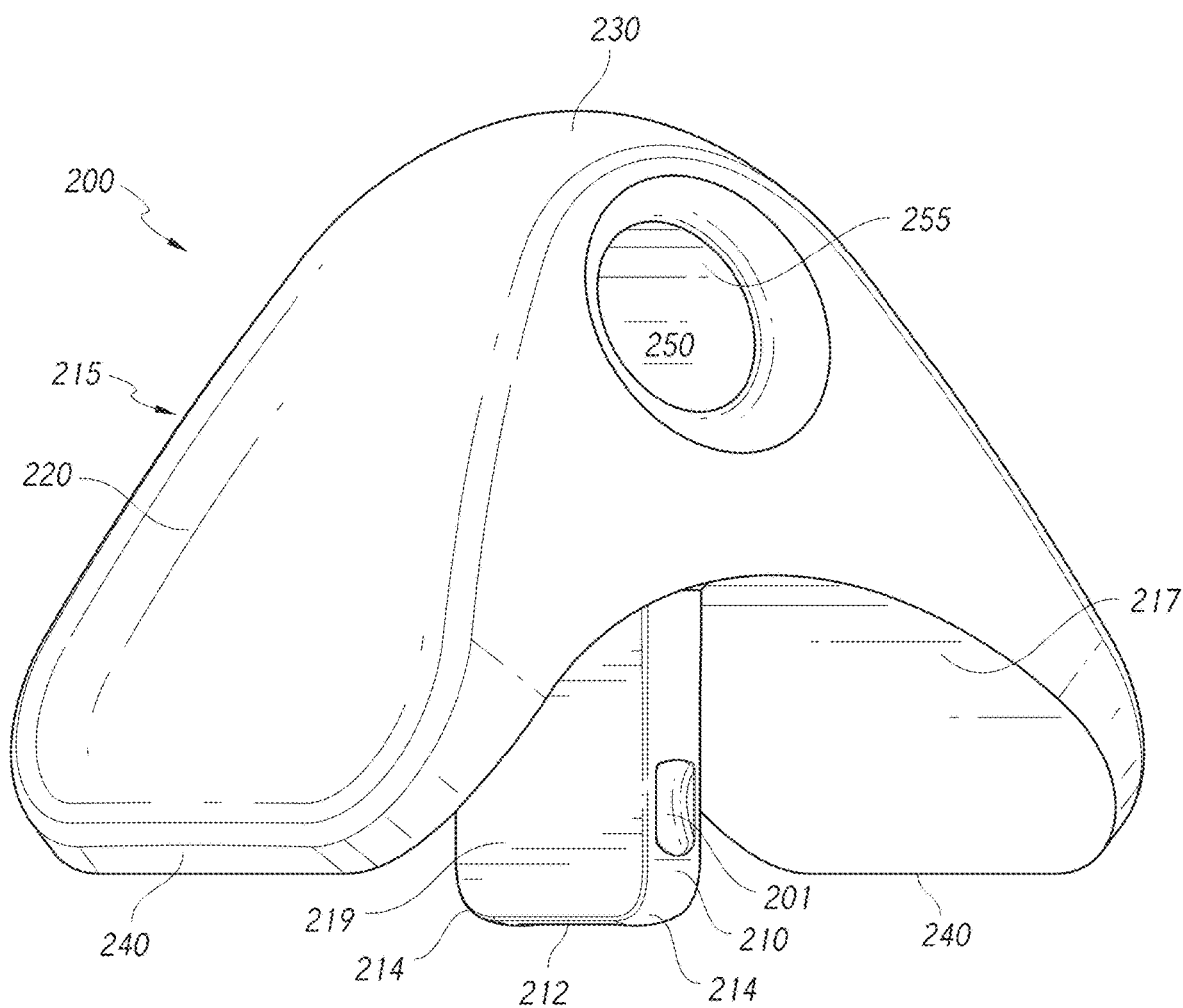
FIG. 4 is an illustration of an example of a perspective view of connector.

As illustrated in FIG. 4, in some embodiments the connector 200 can comprise a generally saddle-shaped cap portion 215 with a generally smooth or curvilinear outer and upper surface 220 and a generally smooth or curvilinear distal or underside surface 217 that do not include sharp or protruding edges, corners, or sides, in order to resist or avoid snagging, puncturing, or scratching a person, a person's clothing, a mobile electronic device, or other items. In some embodiments, as shown, the outer and upper surface 220 of the cap portion 215 can comprise a first curvature, and the distal or underside surface 217 of the cap portion 215 can comprise a second curvature. As illustrated, the first curvature can be steeper or greater than the second curvature. As illustrated, the upper or proximal portion can be narrower or smaller than the lower or distal portion in some embodiments. In some embodiments, the upper and outer surface 200 can be tapered. For example, the upper and outer surface 200 can become continuously more narrow in the distal-to-proximal direction. The upper or proximal portion can be hollow. The connector 200 can be made of any suitable material, including a rigid polymer material such as polycarbonate, a rigid metal material such as aluminum or steel, a ceramic or wood, or an elastomeric, flexible, or resilient material such as silicone, depending on the desired characteristics of the connector and its particular application.

In some embodiments, from a top or proximal region 230 to a bottom or distal edge 240, the outer and upper surface 220 can extend in a continuously smooth and curvilinear shape. As shown, the top or proximal region 230 can comprise a generally horizontal width that is substantially smaller than a generally horizontal width at the bottom or distal edge 240 of the connector. For example, in some embodiments, the width at the bottom or distal edge 240 of the connector 200 can be at least about half again as large or at least about twice as large as the width at the top or proximal region 230 of the connector 200.

Figure 5:
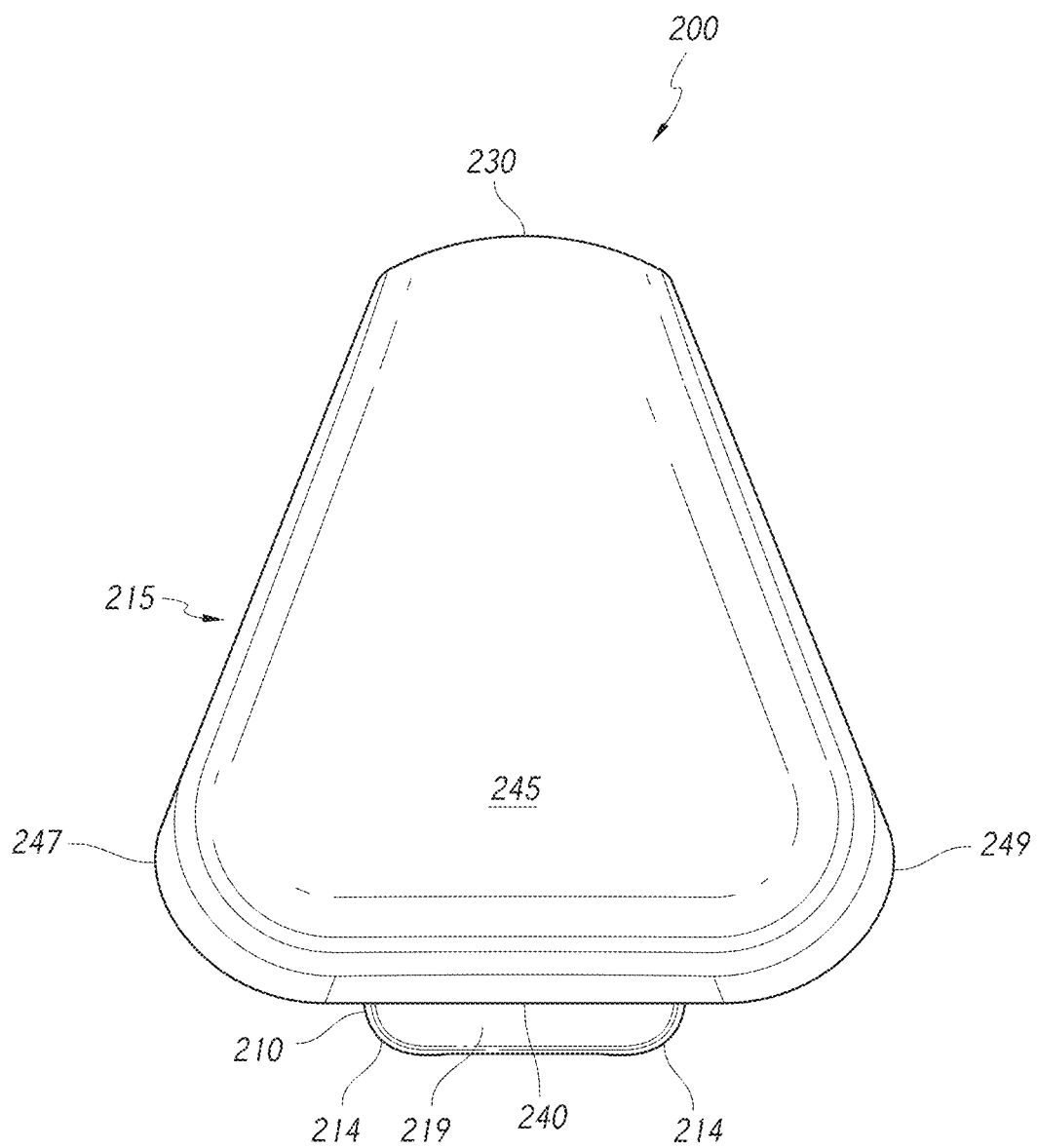
FIG. 5 is an illustration of a front plan view of the connector of FIG. 4.
Figure 6:
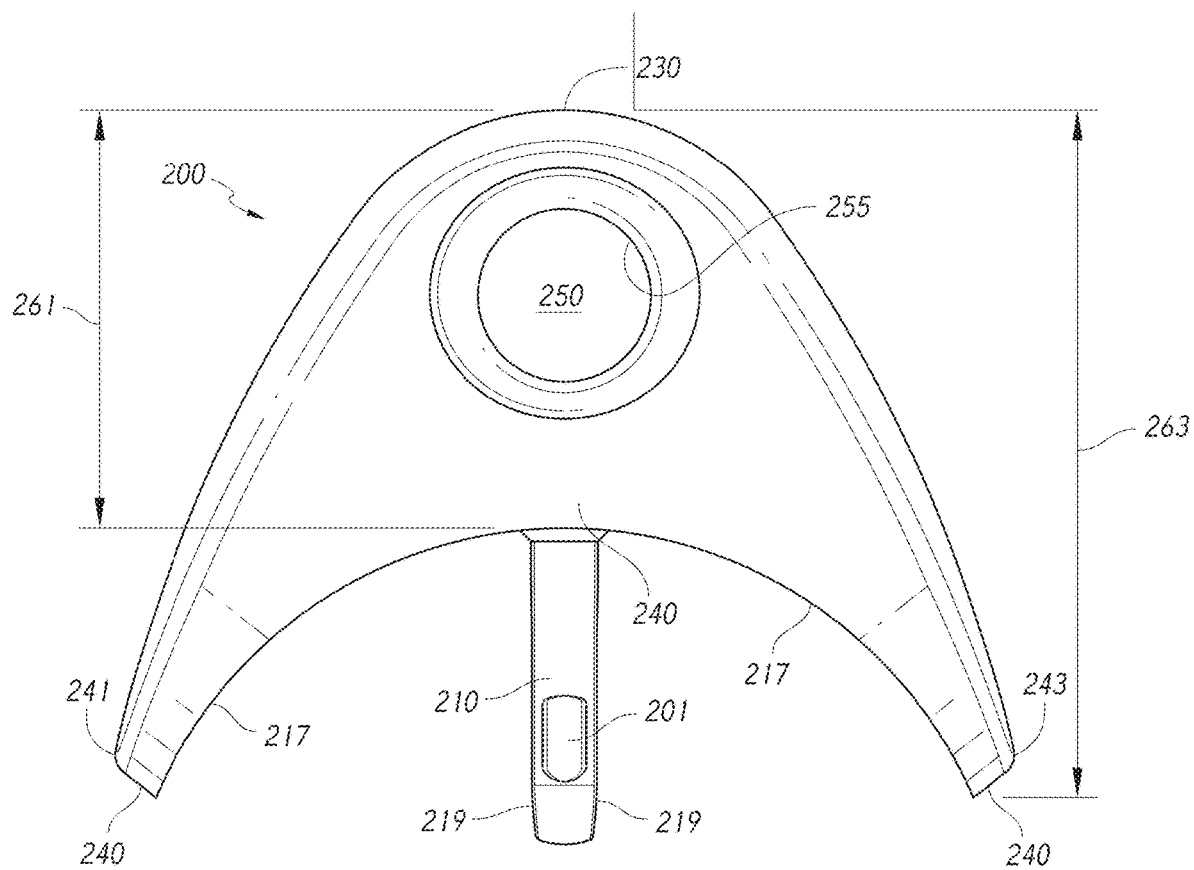
FIG. 6 is an illustration of a side view of the connector of FIG. 4.
Figure 11:
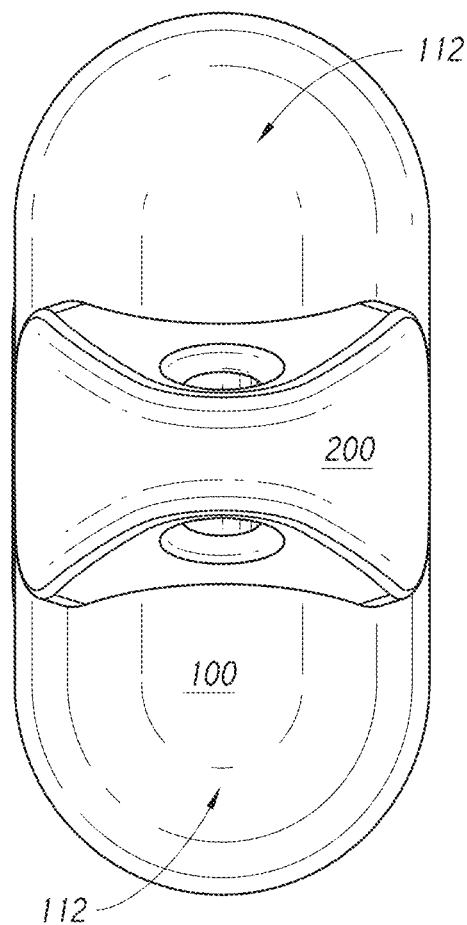
FIG. 11 is an illustration of a top view of the connector and mobile electronic device of FIG. 8 when coupled together.

As illustrated by comparing FIGS. 5 and 6, in some embodiments, the bottom or distal edge 240 of the outer and upper surface 220 can be substantially wider between its front end 241 and its rear end 243 (e.g., see FIG. 6) than across its front surface 245 or across its rear surface (e.g., between its left lateral side 247 and its right side lateral side 249 as shown, for example, in FIG. 5). As shown, in some embodiments, the width of the bottom or distal edge 240 from the front end 241 to the rear end 243 can be at least about half again as large or at least about twice as large as the width of the bottom or distal edge 240 between the lateral sides 247, 249 across the front or rear surfaces. In some embodiments, as shown, the overall proximal-to-distal height of the connector 200 (e.g., from the proximal region 230 of the cap 215 to the distal end of the protrusion 210) can be about the same as and/or less than the overall lateral side-to-side width of the connector (e.g., as shown in FIGS. 5 and 11), and/or can be about the same as and/or less than the overall front-to-back width of the connector (e.g., as shown in FIG. 6). As shown in FIG. 6, the proximal-to-distal vertical height 261 of the cap 215 in a central region, about halfway between the front and rear ends 241, 243 is substantially smaller than the proximal-to-distal vertical height 263 of the cap 215 in a peripheral region (e.g., the vertical distance between either of the front or rear ends 241, 243 and the proximal region 230), such that the cap extends substantially further in the distal direction in the middle region of its front and rear surfaces than in the middle region of its lateral surfaces.

As shown in FIGS. 4 and 6, the connector 200 can include an access region 250. The access region can be included in the upper or proximal region of the cap 215. In some embodiments, as illustrated, the access region 250 is an aperture with a generally surrounding wall 255. In some embodiments, the access region can comprise another or an additional type of connection, such as a threaded, snap-on, friction fit, clip-on, bayonet, or other type of connection. The access region 250 can provide a region where the one or more holding or securing devices 300 can removably couple or be fixed to the connector 200.

The connector 200 can include a distally extending protrusion 210. As shown in FIGS. 4-6, in some embodiments the distally extending protrusion 210 extends distally further than the bottom or distal edge of the outer and upper surface 200. In the illustrated example, the protrusion 210 is generally rectangular and generally planar and flat, such that its side width is substantially smaller than its front width. A distal edge 212 of the protrusion 210 can be generally straight and flat (as shown), or ramped, tapered, or rounded (not shown) gradually increasing its thickness in a distal to proximal direction. One or more distal corners or regions 214 of the protrusion can be generally rounded or non-sharp to resist creating punctures, tears, or scratches on clothing or on other items or persons.

As illustrated in FIGS. 5 and 6, the distal edge 240 of the outer and upper surface 200 can include at least one or a plurality of curved, bowed, or arched regions. In some embodiments, as shown, the one or more curves, bows, or arches has a downwardly convex shape across its front and rear surfaces (see FIG. 5) that includes distal-most points generally in the middle region of each of the front and rear surfaces of the curve, bow, or arch on the distal edge 240 of the outer and upper surface 200, and proximal-most points generally in the middle region of its lateral left and right surfaces (e.g., at its lateral left and right ends 247, 249). Viewed from a different perspective, the curve, bow, or arch has a downwardly concave shape across its lateral side surfaces (see FIG. 6) that includes distal-most points on its front and rear ends and proximal-most points generally in the middle of the left and right sides of the curve, bow, or arch on the distal edge 240 of the outer and upper surface. In the example of FIGS. 4-6, the outer and upper surface 200 of the cap 215 extends further distally in the middle regions along its front and rear surfaces than along the middle regions of its left and right side edges.

Figure 7:
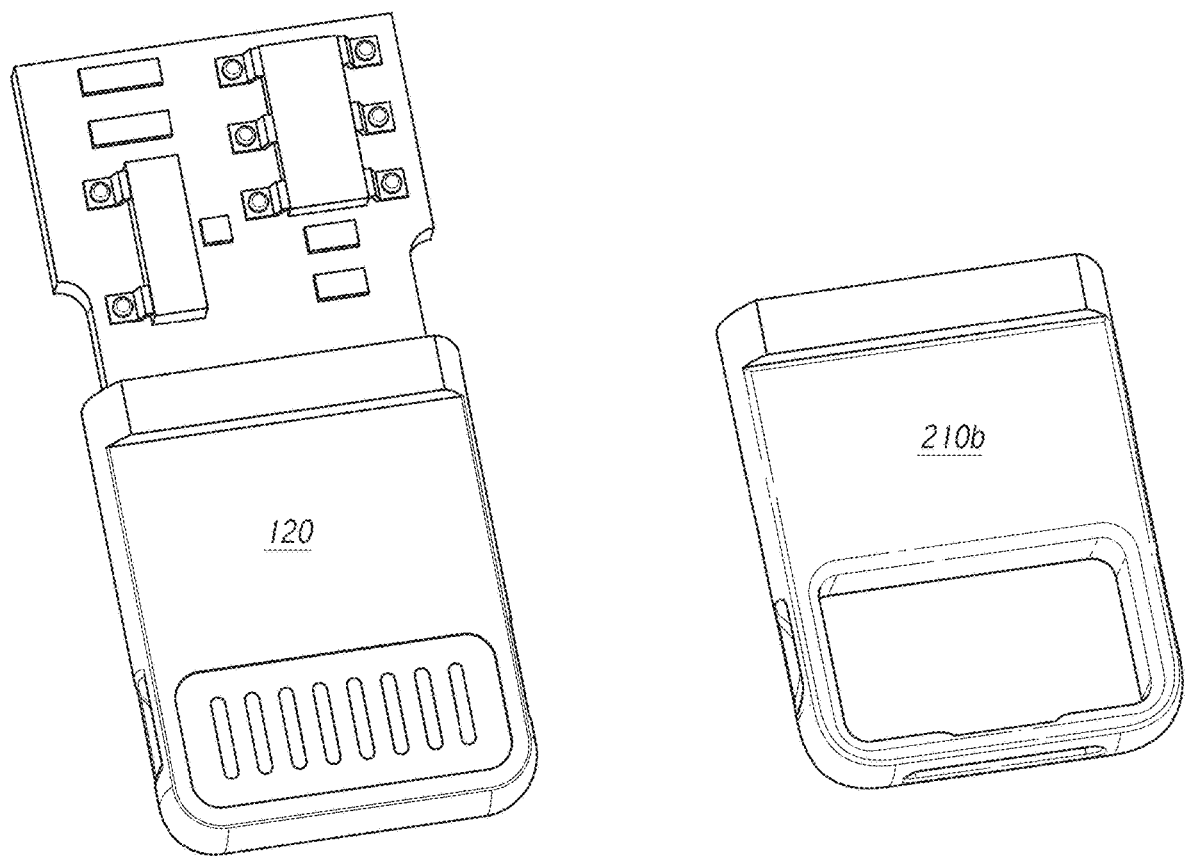
FIG. 7 is an illustration of front plan views of an example of a standard electronic wire tip connection and an example of a protrusion portion that can be used in the connector of FIG. 4.
Figure 8:
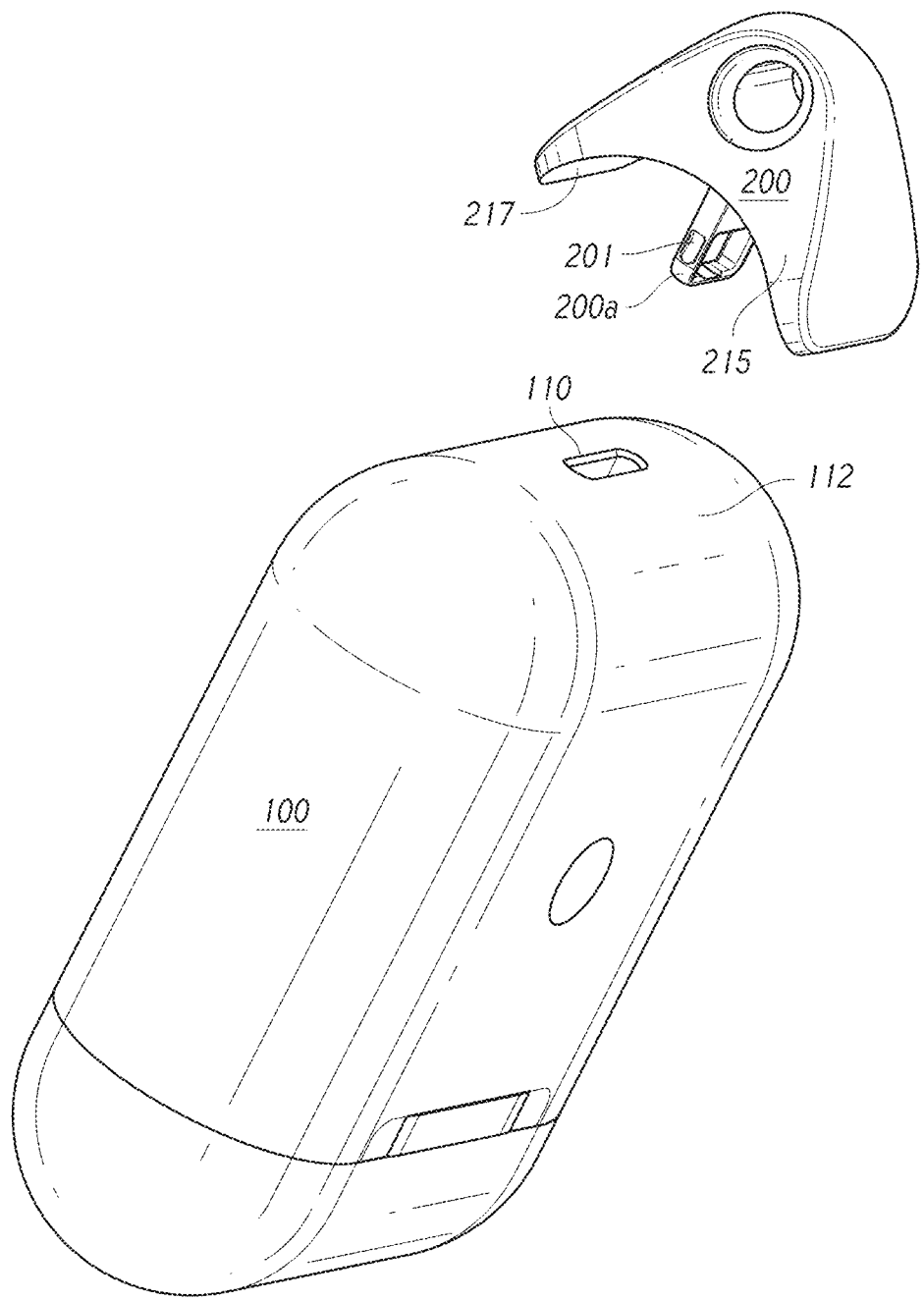
FIG. 8 is an illustration of a perspective view of an example of a connector in the process of being coupled with a mobile electronic device.

As shown in FIG. 7, in some embodiments at least a portion of the protrusion 210 can be provided in the form of a coupling structure 210b that is shaped on its front, back, and/or sides to mimic or be substantially the same as the outer shape of a standard electronic wire tip connection 120 that is intended for use in the corresponding electronic port 110 of the mobile electronic device 100. In some embodiments, as shown in FIGS. 4-6, the protrusion 210 is formed integrally with, unitary with, and/or out of the same material, as the cap 215; in some embodiments, as shown in FIGS. 2 and 8, the protrusion 210 is formed at least in part using a separate coupling structure 210a, 210b that is attached to or coupled with the cap 215.

For example, the coupling structure 210a, 210b can be or can comprise a metallic surface or a metallic frame (e.g., a frame with sides and an open interior). In some embodiments, the surface or frame comprises zinc. As shown in FIG. 2, the coupling structure 210b can be part of the cap portion 215 (such as by insert-molding, co-molded, adhesive attachment, friction fitting, etc.) such that a proximal portion of the coupling structure 210b is attached to or embedded within the cap portion 215 and a distal portion of the coupling structure 210b extends distally away from the distal or underside surface 217 of the cap portion 215. In some embodiments, the coupling structure 210b can comprise a frame with an open or hollow interior. In some embodiments, a coupling structure 210a can comprise a frame with a solid or substantially filled interior. A metallic frame can include plastic injected into the open interior of the frame during the manufacturing process. The metallic frame can provide durability to ensure a secure connection between the connector 200 and the mobile electronic device even after many repeated uses, while the filled-in plastic interior can provide strength to resist bending of the frame and/or can provide friction against one or more structures in the interior of the port 100 when inserted to help secure the connector 200 to the mobile electronic device 100.

In some embodiments, when the coupling structure is not a frame but a generally continuous surface (e.g., made of metal), the surface can vary in shape and thickness to conform to corresponding structures and/or surfaces of the port 110 of the mobile electronic device 100 to which the coupling structure is configured to attach. In any embodiment, the distal edge 212 of the protrusion 210 can be tapered such that it is thinner on its distal-most point than it is in region that is spaced from the distal-most point, and/or the distal edge 212 or any other portion of the protrusion 210 can comprise one or more ramps or slants or curved surfaces to facilitate smooth insertion of the protrusion 210 into the port 110 while diminishing the risk of damage to the protrusion 210 and/or the port 110. In any type of coupling structure or protrusion 210, a plurality of separated sides or protrusions can be provided. For example, a fork-like protrusion (not shown) with at least two side arms that are not connected to each other can be provided for insertion into the port 210 of the mobile electronic device 100. Each side arm can be configured to contact or interconnect with a corresponding structure within the port 210. A protrusion of this type may not include a single horizontal distal edge 212 as shown in FIG. 7.

In some embodiments, as illustrated, the distal edge 212 of the protrusion 210 can extend distally beyond the distal-most point on the distal edge 240 of the cap portion 215. In some embodiments, as illustrated, the distal-most point(s) on the distal edge 240 of the cap portion 215 can be positioned further in the distal direction than the exposed base of the protrusion 210, where the protrusion 210 encounters the distal or underside surface of the cap 215. In some embodiments, as illustrated, the outer perimeter or periphery of the exposed based of the protrusion 210 where the protrusion encounters the distal or underside surface of the cap 215 is entirely within the outer perimeter or periphery of the distal or underside surface of the cap 215. In some embodiments, as shown, at least a majority of, or substantially all of, the outer and upper surface 220 of the cap 215 is oblique to (and not parallel or perpendicular to) the front or rear faces 219 of the protrusion 210. The protrusion 210, as shown, can be positioned on the connector 200 such that it extends along a central or longitudinal axis of the connector.

Figure 9:
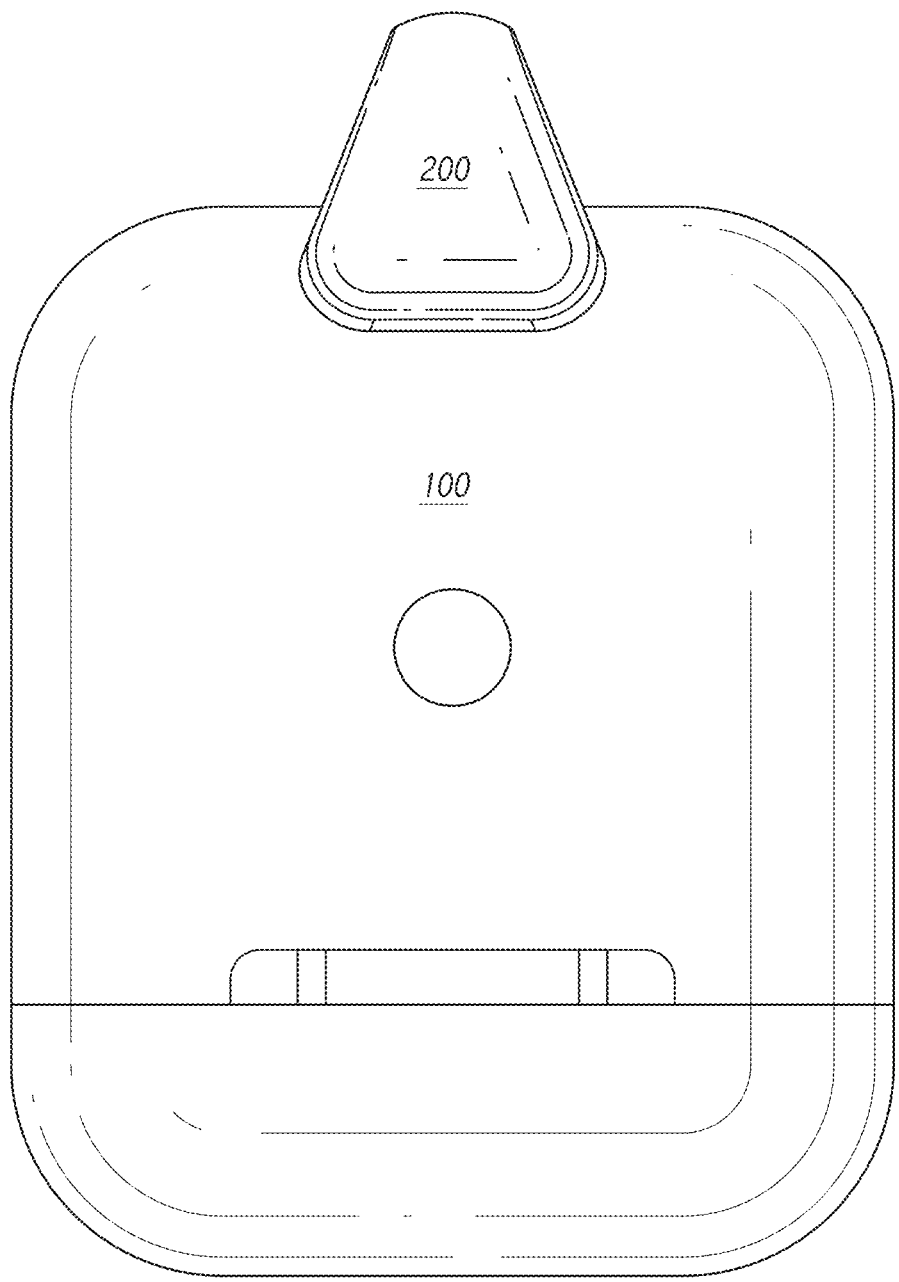
FIG. 9 is an illustration of a front plan view of the connector and mobile electronic device of FIG. 8 when coupled together.
Figure 10:
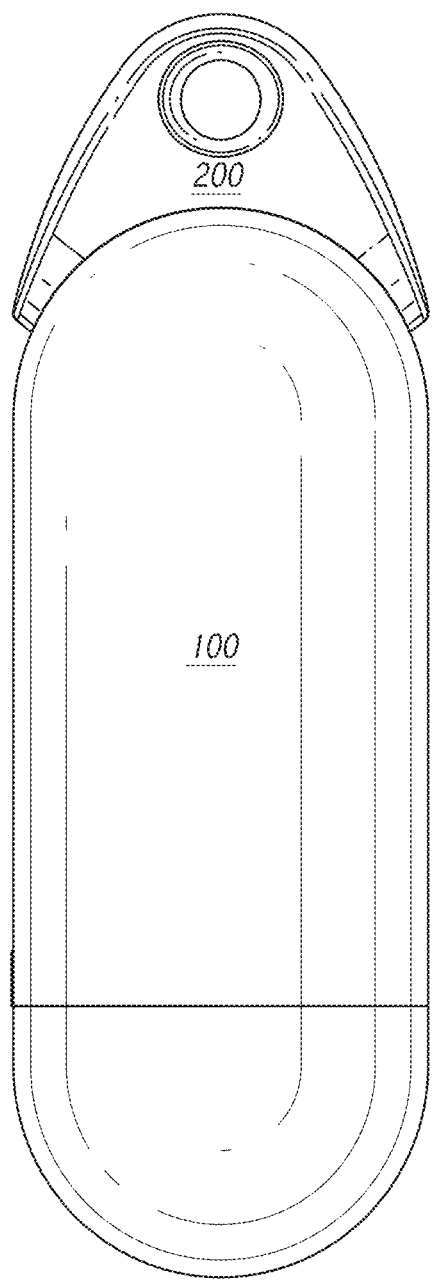
FIG. 10 is an illustration of a side view of the connector and mobile electronic device of FIG. 8 when coupled together.

As shown in FIGS. 8-11, the connector 200 can be configured to be advanced toward the access region or electronic port 110 until the protrusion 210, 210a is inserted into the access region or electronic port 110 and the distal or underside surface 217 contacts, seats on, abuts, or registers against an outer surface 112 of a region of the mobile electronic device 100 that generally surrounds the access region or electronic port 110. In some embodiments, as shown in FIGS. 9 and 10, the distal or underside surface 217 can tightly or snuggly contact, seat on, abut, or register against the outer surface 112 of the mobile electronic device 100, such that little, if any, open space or gap exists between the distal or underside surface 217 and the outer surface 112 of the mobile electronic device 100. As illustrated in FIGS. 9 and 10, the distal or underside surface 217 can be shaped and sized to generally correspond to or conform with at least a portion of the outer surface 112 of the mobile electronic device 100 (e.g., an outer surface at an outer edge region where the port 110 is located, as shown). In some embodiments, when installed as shown in FIGS. 9 and 10, one or more distal-most portions of the front and/or rear of the cap 215 that is or are configured to contact the front and/or rear surfaces of the mobile electronic device 100 can extend distally further than one or more distal-most portions of either or both of the lateral sides of the cap 215 that is or are configured to contact the top or proximal surface of the mobile electronic device 100 or other region where the port 110 is located.

Figure 8A:
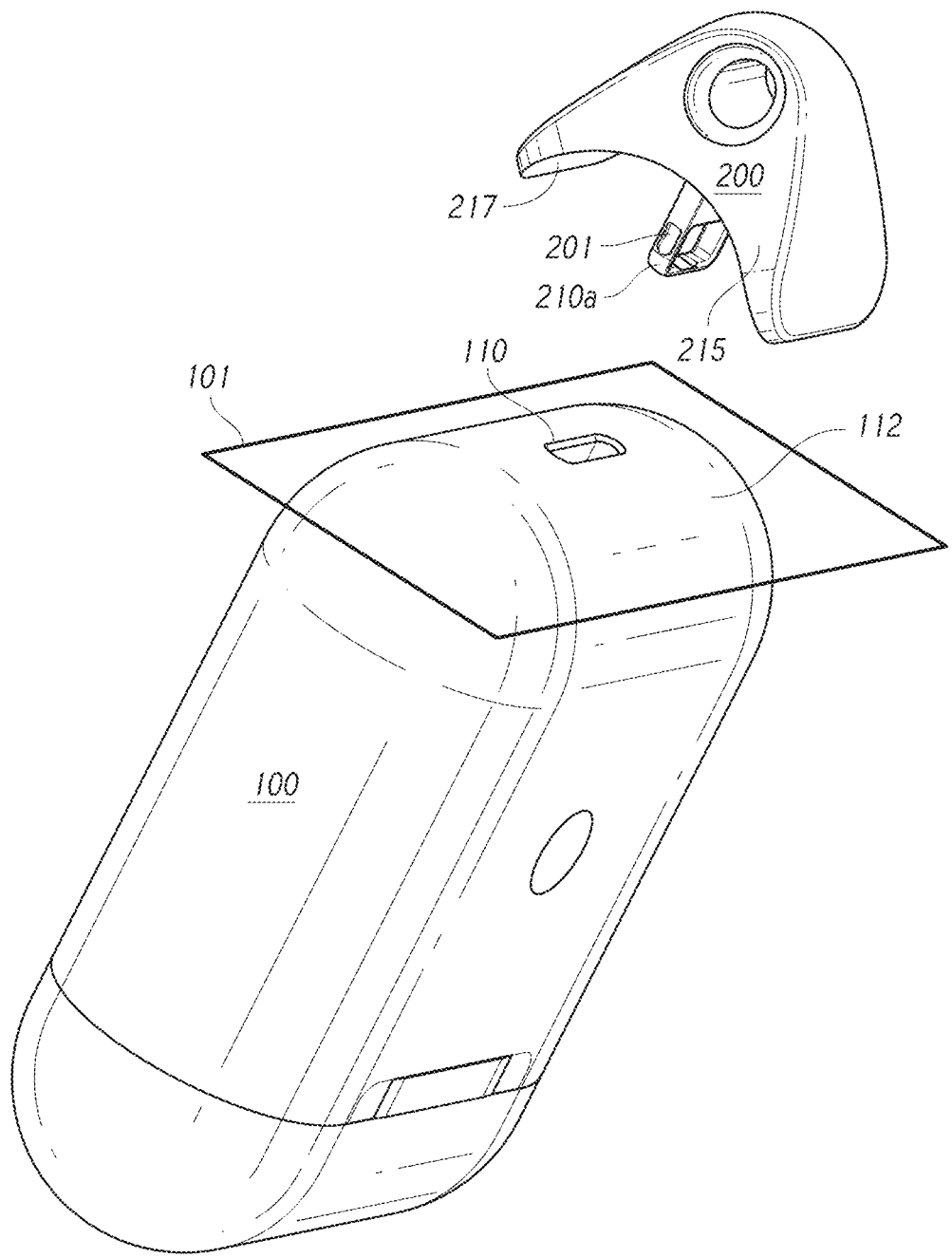
FIG. 8a in the perspective view of the connector and mobile electronic device of FIG. 8 with a perspective illustration of perpendicular Plane 101 that is tangent to or contacts the port into which the connector is configured to be inserted.
Figure 9A:
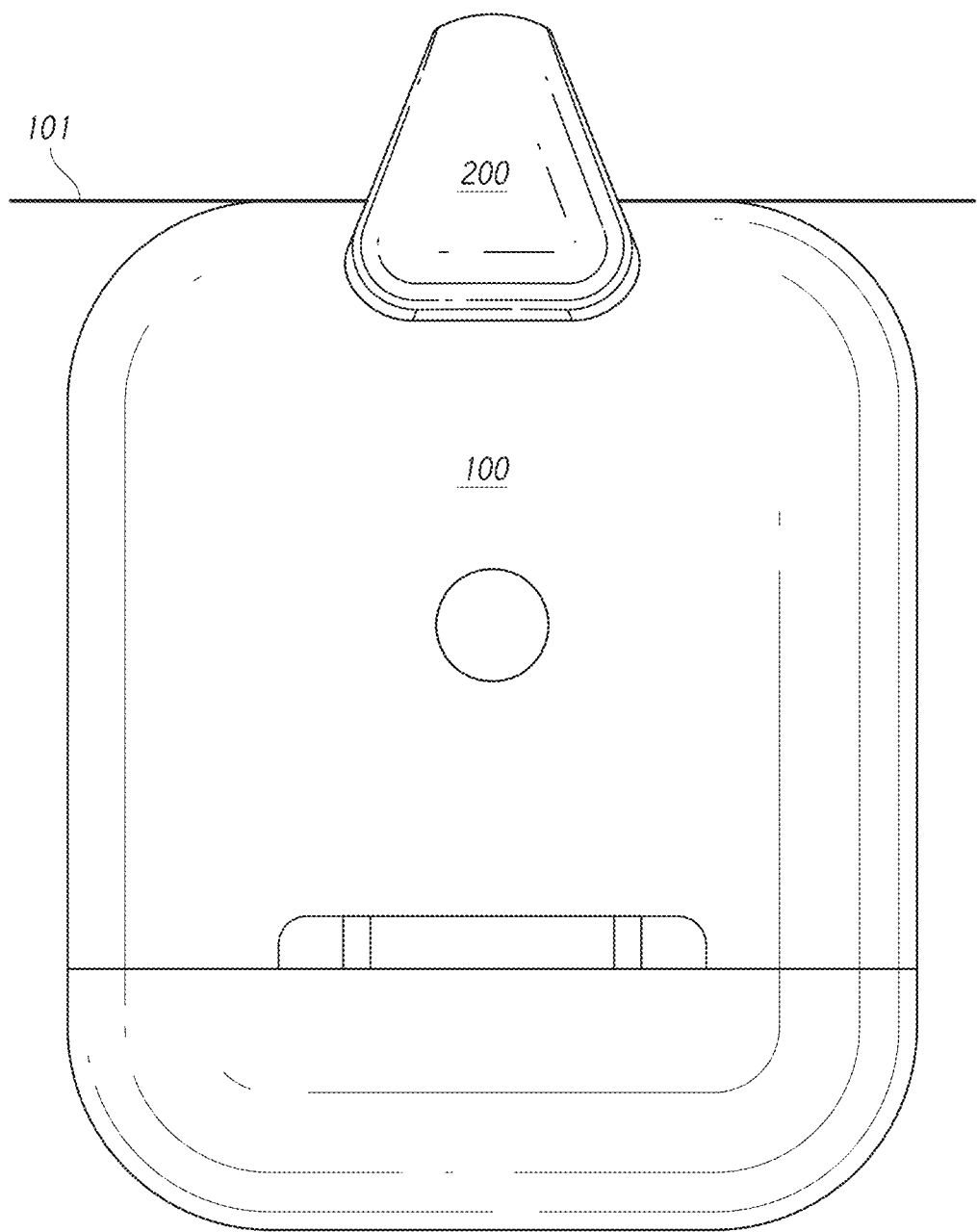
FIG. 9a is the front plan view of the connector and mobile electronic device of FIG. 9 with a front view of Plane 101.
Figure 10A:
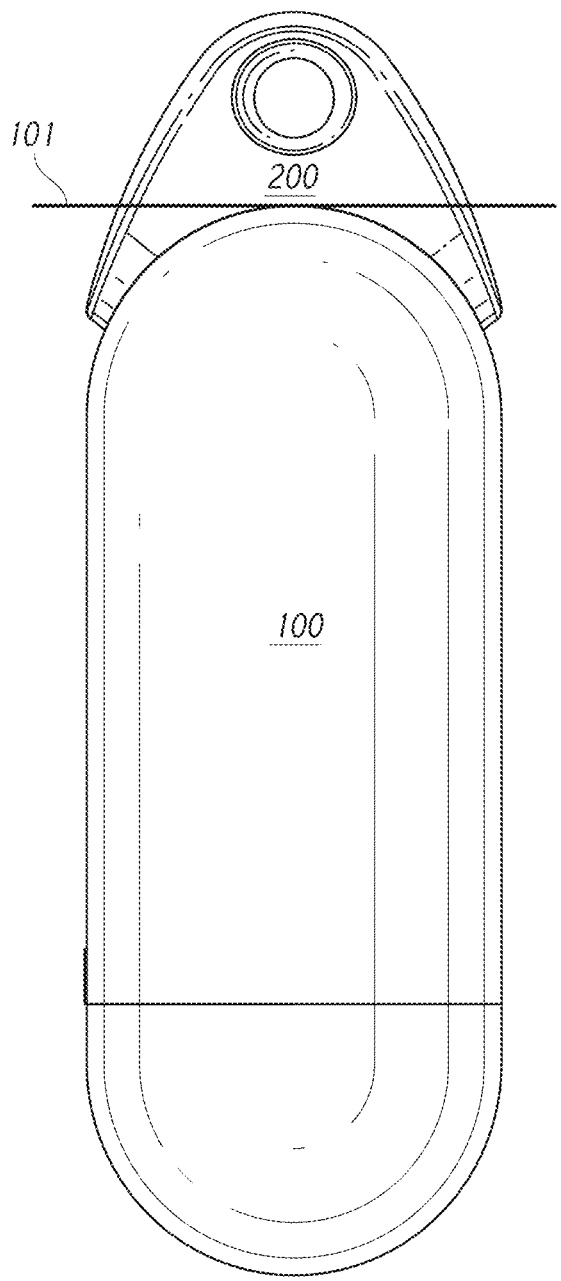
FIG. 10a is the side view of the connector and mobile electronic device of FIG. 10 with a side view of Plane 101.

FIGS. 8a, 9a, and 10a illustrate Plane 101 that contacts or is tangent to a surface in which port 110 is located essentially at a point, line, or plane, depending on how the outer surface 112 of the mobile electronic device 100 is shaped and oriented. In the illustrated embodiment, since outer surface 112 is curved in one direction, Plane 101 contacts the surface in which port 110 is located along a line. In some embodiments, Plane 101 can contact the surface in which port 110 is located along a plane (e.g., when the port 110 is located on a planar surface) or essentially at a point (e.g., when the port 110 is located on a surface that is curved in two directions). As shown, Plane 101 is generally perpendicular or orthogonal to the lateral sides of the mobile electronic device 100. It is noted that FIGS. 8a, 9a, and 10a include all of the structure of FIGS. 8, 9, and 10, with the illustration of Plane 101 merely adding a manner of describing what already exists in these figures.

As shown in FIGS. 9a and 10a, when the connector 200 is fully attached to the mobile electronic device 100, the connector 200 can be sized and shaped such that at least a portion of the connector 200 can extend further in a distal direction past or beyond the Plane 101, either when the mobile electronic device 100 is enclosed within a case or not. For example, as illustrated, at least a portion of the front of the connector 200 can extend distally past or beyond the Plane 101, and/or at least a portion of the rear of the connector 200 can extend distally past or beyond the Plane 101. In the illustrated embodiment, the underside surface 217 of the connector 200 is in contact with or abuts against the surface in which port 110 is located, or a surface of a case generally enclosing or generally surrounding the mobile electronic device 100 adjacent to where the port 110 is located, along a majority of, or substantially all or all of, the underside surface 217 of the connector 200 when the connector 200 is attached to the mobile electronic device 100. In some embodiments, a portion of the underside surface 217 can contact the mobile electronic device 100, or a case generally enclosing or generally surrounding the mobile electronic device 100, and a portion of the underside surface 217 can be spaced from the mobile electronic device 100 or a case enclosing or generally surrounding the mobile electronic device 100. For example, the underside surface 217 can contact the mobile electronic device 100 or a case enclosing or generally surrounding the mobile electronic device 100 at or near the protrusion 210a, can contact the mobile electronic device 100 or a case enclosing or generally surrounding the mobile electronic device 100 at one or more regions distal from Plane 101, and/or can be spaced from the mobile electronic device 100 or a case enclosing or generally surrounding the mobile electronic device 100 in one or more regions in between, forming a bridge-like structure.

As shown, when installed in place on the mobile electronic device 100, the connector 200 can be configured to contact, extend over, or overlap at least a portion of the front, back, and/or top of the mobile electronic device 100 at the same time. As illustrated in FIG. 11, in some embodiments, the front-to-back thickness of the connector 200 can be configured to be about the same size as or even larger the front-to-back thickness of the mobile electronic device 100 to which the connector 200 is configured to couple. As illustrated, in some embodiments, the lateral side-to-side thickness of the connector 200 can be configured to be substantially less than the lateral side-to-side thickness of the mobile electronic device 100 to which the connector 200 is configured to couple. The connector 200 can be configured to extend across less than the entire top, proximal, or other surface of the mobile electronic device 100 to which the connector 200 is configured to couple. For example, in some embodiments, the connector 200 can be configured to extend across about half or less of the top, proximal, or other surface of the mobile electronic device 100 to which the connector 200 is configured to couple.

Figure 12:
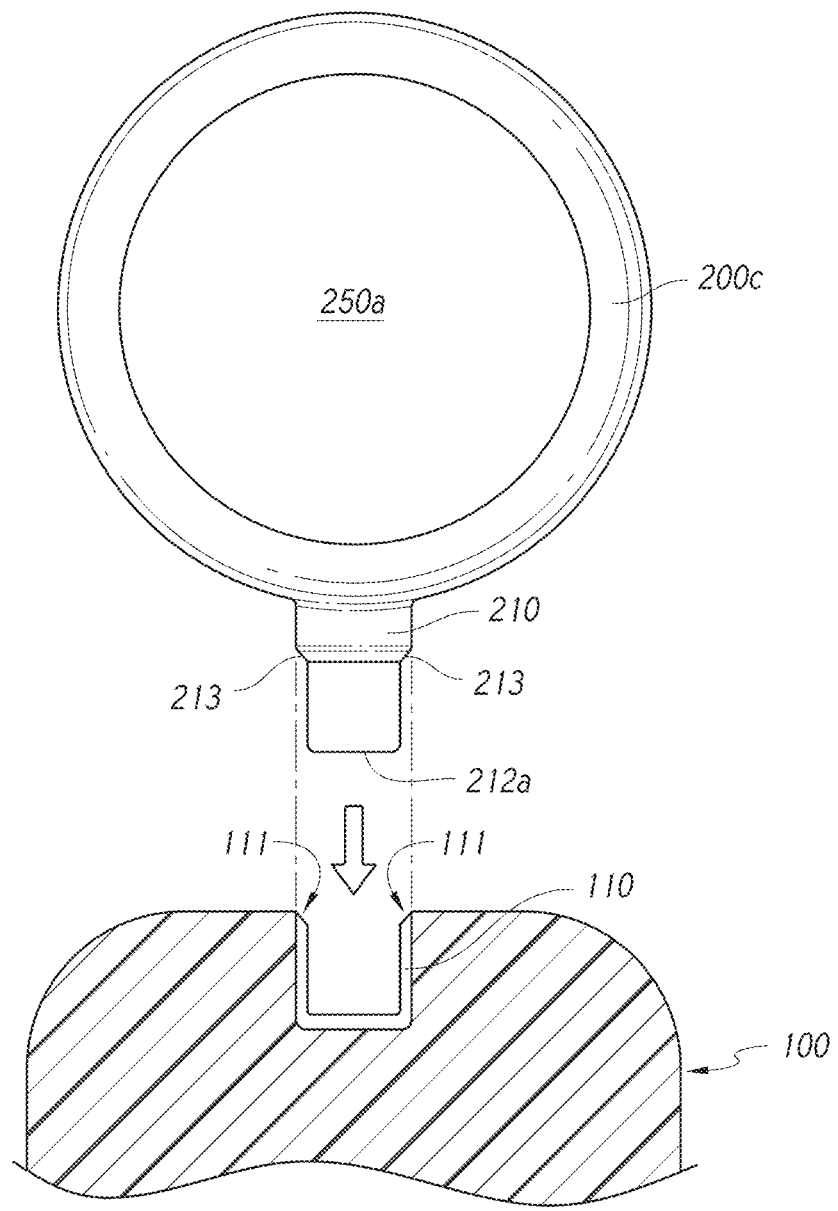
FIG. 12 is an illustration of a front view of another connector with the mobile electronic device of FIG. 3 shown in a schematic cross-sectional view.

FIG. 12 illustrates another embodiment of a connector 200c about to be removably attached to a mobile electronic device 100 via an electronic port 110. As with all embodiments described and/or illustrated in this specification, the connector 200c can include any structure, material, function, method, or step that is described and/or illustrated in any other example in this specification in addition to or instead of those described and/or illustrated in the connector 200c. The connector 200c can include an access region 250a, a protrusion 210 with an abutment surface 213, and a distal edge 212a. The access region 250a can include any of features of the other access regions illustrated and/or described elsewhere in this specification. As illustrated, the cap portion or upper proximal portion of the connector 200c can be generally round or generally annular. In the example shown, the upper proximal portion of the connector 200c does not contact the mobile electronic device 100 or a case enclosing or generally surrounding the mobile electronic device 100 when fully attached (e.g., when the protrusion 210 is fully inserted into the electronic port 110).

The abutment surface 213 can be a tapered, angled, beveled, or chamfered surface as illustrated in the example of FIG. 12. As shown, the abutment surface 213 can be a generally continuous surface. In some embodiments, the abutment surface can comprise one or more laterally extending bumps, ridges, or protrusions that may be discontinuous. The abutment surface 213 can be shaped, oriented, and/or positioned so that when the protrusion 210 is inserted into the electronic port 110, the abutment surface 213 can firmly and securely abut or contact or push against a corresponding port surface 111 on or within the electronic port 110, such as an angled edge or periphery or perimeter of the electronic port 110. In some embodiments, at least a portion of the port surface 111 can be generally flush with an outer surface or edge of the mobile electronic device 100 and/or at least a portion of the port surface 111 can be recessed within the mobile electronic device 100. The correspondence or fit between the abutment surface 213 and the port surface 111 can provide lateral stability to resist lateral forces or movement between the protrusion 210 and the electronic port 110. As shown, in some embodiments, the protrusion 210 can comprise a tapering or sloping edge with a first proximal portion that has a larger width than a second distal portion.

The size, shape, and/or one or more other features of the protrusion 210 (e.g., protrusions 210a, 210b) can be configured to create sufficient resistance to withdrawal of the protrusion from the access region or electronic port 110 as to avoid unintentional detachment or decoupling of the mobile electronic device 100 from the connector 200 in normal use.

The port 110 can comprise an internal generally static receiving region (not shown) that generally surrounds the protrusion 210 and/or that is abutted, pushed into, or otherwise contacted by the protrusion 210 when the protrusion 210 is inserted into the port 110. The receiving region can include a material that is generally rigid but that has some degree of resilience, elasticity, or flexibility. For example, the receiving region can include one or more plastic parts (e.g., made of ABS plastic) that are configured to contact the protrusion 210 when inserted. The protrusion 210 can be configured to be slightly larger in at least one dimension or in multiple dimensions than the corresponding one or more dimensions of the receiving region of the port 110. The protrusion 210 can be configured so that, when the protrusion 210 is inserted into the port 110, the structure of the receiving region slightly deforms, stretches, expands, or otherwise moves so as to tightly, snugly, or securely receive the protrusion 210. In some embodiments, the protrusion 210 can be slightly larger in one or more dimensions than the protrusion of the electronic connector to which the port 210 is designed to attach. The slightly larger size and/or shape of the protrusion 210 can produce substantial resistance against removal of the protrusion 210 from the port 110.

In some implementations, as with the Lightning port as illustrated in FIG. 3, the port 210 in the mobile electronic device 110 can also include an active coupling system (in addition to the receiving region), such as one or more tiny reciprocating devices that are biased or spring-loaded to interlock or engage with an attachment member that is inserted into the port 110, requiring a higher amount of force to insert or withdraw the attachment member than would be required by the force of friction created merely by corresponding protrusions and recesses by themselves. The protrusion 210 can be sized, shaped, and/or otherwise configured to function with an active coupling system of the mobile electronic device 100 in substantially the same way as would an electronic connection for which the electronic port 110 was designed by its manufacturer. For example, the protrusion 210 can include one or more retaining or engaging structures 201, such as one or more recesses, indentations, projections, and/or detents that are configured to interact with the active coupling system of the port 110.

In some embodiments, the protrusion 210 can include one or more static friction-increasing elements, such as one or more coatings, coverings, and/or surface features, etc., that provide resistance to insertion and/or withdrawal of the protrusion 210 from the port 110. For example, the protrusion 210 can be overmolded or otherwise provided with silicone or any other resilient, elastomeric, or flexible material; the protrusion 210 can include a high-friction surface texture, such as a surface that includes one or more small surface knurlings, roughenings, protrusions, bumps, ridges, layer lines, recesses, etc., that produce increased friction or that interlock, engage, contact, or fit within or receive corresponding structures in the port 110 to increase friction and/or otherwise resist movement.

In some embodiments, the force required to remove the connector 200 from the mobile electronic device 100 can be produced, augmented, or controlled by providing one or more additional or alternative structures. For connectors 200 in which there is no protrusion 210 (e.g., connectors 200 that attach to mobile electronic devices 100 without a port, including mobile electronic devices 100 that charge and/or provide audio communication wirelessly), such structures can be the primary or sole means for coupling, interconnecting, or adhering the connector 200 to the mobile electronic device.

In some embodiments, a removable adhering surface (not shown) can be provided on at least a portion of the distal or underside surface 217 of the cap 215. In some embodiments, when a user purchases the connector 200, an optional adhering surface can be separately provided in the package for use if desired, or the adhering surface can be provided as an original, stock part of the connector 200. If optional, when a user desires to increase the amount of force required to detach or decouple the connector 200 from the mobile electronic device 100, the user may affix the adhering surface to the distal or underside surface 217 of the cap 215. In some embodiments, a proximal or upper side of the adhering surface may comprise a first adhesive with a first breaking force that is generally configured to allow the adhering surface to remain on the distal or underside surface 217 of the cap 215 before and after insertion and withdrawal of the connector 200 from the mobile electronic device 100 (unless intentionally peeled off or otherwise removed); and a distal or lower side of the adhering surface may comprise a second adhesive with a second breaking force that is configured to permit the connector to firmly and securely remain in place against the mobile electronic device 100 unless an intentional force is applied by the user to detach or decouple the connector 200 from the mobile electronic device 100. In some embodiments, the first breaking force is substantially greater than the second breaking force so that the adhering surface separates from the mobile electronic device 100 well before the adhering surface separates from the connector 200.

A collection or kit of a plurality of adhering surfaces with different second breaking forces can be provided in the packaging with the connector 200, or purchased separately by the user, in order to give the user a plurality of options for how strongly the connector 200 will be attached to the mobile electronic device 100. For example, the user can choose an appropriate adhering surface depending on how heavy the mobile electronic device 200 is or how strong the unintentional forces are expected that may be applied to otherwise detach or decouple the connector 200 from the mobile electronic device 100 (such as when the connector 200 is intended to be used while running or while driving over bumpy terrain).

Other examples of additional or alternative structures for producing, controlling, or augmenting the force required to detach or decouple the connector 200 from the mobile electronic device 100 can include one or more suction-creating surfaces (e.g., many small suction cups or a large suction cup that can be about the same size as the distal or underside surface 217 of the cap 215) and/or tiny setae structures to provide gripping between the distal or underside surface 217 of the cap 215 and the mobile electronic device 100. The suction cup(s) or setae can be molded directly or permanently into the material of the cap 215 or can be affixed or attached in a separate manufacturing step or by the user after purchase.

In situations where there is no protrusion 210, and/or no readily available means to definitively locate the connector 200 in a desirable or advantageous location on the mobile electronic device 100, a device can be provided to help the user select such a location. For example, in some embodiments, a positioning template (not shown) can be provided in the packaging of the connector 200, or purchased separately, that is designed for use with a specific type or category of mobile electronic device 100. The template can include a first surface that is lightly adherent and can be positioned against a side of the mobile electronic device 100 where the connector 200 is desired to be located. The first surface can be placed downward against the side of the mobile electronic device 100 so as to temporarily maintain the template in place on the first surface of the mobile electronic device 100. The template can include an opening through which the connector 200 can be attached or coupled to the side of the mobile electronic device 100. The opening can guide the user to attach or couple the connector 200 in an advantageous or desirable location on the mobile electronic device 100, such as in a generally centered position on the side of the mobile electronic device 100. After the connector 200 is attached or coupled to the mobile electronic device 100, the template can be removed and stored or discarded.

In some embodiments, the protrusion 210 can automatically change shape when inserted into the mobile electronic device 100, even without actuation by a user. For example, the protrusion 210 can include an initial position to which the protrusion is biased, and a second position that the protrusion 210 can be urged into when inserted into the port 110. In some embodiments, the initial position can be created by a longitudinal or axial split or groove (not shown) in the protrusion 210 that separates two portions of the protrusion slightly away from each other. When the separated portions are moved or forced toward each other, such as when the protrusion 210 is inserted into the port 110 of the mobile electronic device 100, this split or groove can diminish in size or be closed. The bias of the portions of the protrusion 210 to be positioned further apart can produce an outward restoring force between the protrusion 210 (e.g., in a spring-like action) and one or more structures within the port 100 that can increase the friction between the protrusion 210 and such structures within the port 100, causing the connector 200 to be held more firmly within the port 100. When an intentional withdrawing force is applied to remove the connector 200 from the port 100, the increased friction can be overcome.

In some embodiments, a force required to remove the connector 200 from the mobile electronic device 100 (whether with or without the use of a protrusion 210) can be at least about 1 pound, or at least about 1.5 pounds, or at least about 3 pounds. In some embodiments, including but not limited to those where multiple means are provided for creating resistance against removal of the connector 200 from the mobile electronic device 100, a force required to remove the connector 200 from the mobile electronic device 100 can be at least about 5 pounds, or at least about 10 pounds, or at least about 20 pounds. In some embodiments, a force required to remove the connector 200 from the mobile electronic device 100 can be at least about 5 times, or at least about 10 times, or at least about 15 times the weight of the mobile electronic device 100 to which the connector 200 is configured to attach. In some embodiments, the force required to remove the connector 200 from the mobile electronic device 100 can be larger than the force require to remove the electronic connector to which the port 210 is designed to attach, such as at least about 1.5 times more force or at least about 2 times more force or at least 5 times more force than is required to remove the electronic connector to which the port 210 is designed to attach. All of these are merely examples.

Some implementations of the connector 200 (not shown) can include one or more actuatable mechanical devices to lock or otherwise significantly increase the force require to remove the protrusion 210 from the port 100 once it has been inserted and an actuation mechanism has been set. For example, in some embodiments, an actuator on the exterior of the cap 215 can be turned or pushed or otherwise moved to transmit a force or torque to a portion of the protrusion 210 inside of the port 110 that can then expand outwardly to abut or lock against an interior surface of the port 110. The connector 200 can then be virtually impossible to remove (without causing damage to the connector 200 and/or the mobile electronic device 100) unless and until the actuator on the cap 215 is reversed in order to retract the previously expanded portion of the protrusion 210, thereby unlocking or releasing it.

In any of the embodiments or combinations of embodiments in this specification, the force required to remove the protrusion 210 from the port 100 or to remove the connector 200 from the mobile electronic device is sufficiently high as to resist unintentional removal during normal use activities, such as a normal amount of jostling or motion that is expected to act upon a tethered device during normal walking, running, hiking, and/or climbing, and/or normal movement of a typically carrying device such as a backpack, book bag, purse, suit case, briefcase, gym bag, to which the connector 200 is expected to be attached.

As shown in FIGS. 9-12, the shape and size of the connector 200, 200c, and the orientation of the connector 200, 200c when attached to the mobile electronic device 100, can help to dissipate damaging forces resulting from insertion or withdrawal of the connector and/or random or unintentional forces applied against the connector 200, 200c and/or the mobile electronic device 100 in a manner that resists damage to the connector 200, 200c and/or the mobile electronic device 100.

For example, as shown, in some embodiments the connector 200 can be relatively short in length as compared to its width. The distance between the access region 250 (as measured from either its proximal or distal surfaces) and the proximal base of the protrusion 210 in the distal or underside surface 217 of the cap 215 can be about the same as or less than the distance between the base of the protrusion 210 and the distal edge of the protrusion 212. Similarly, the distance between the access region 250 and the proximal base of the protrusion 210 in the distal or underside surface 217 of the cap 215 can be less than the distance between the front and back ends 241, 243 of the distal or bottom edge 240 of the cap 215 (e.g., as shown in FIG. 6).

As shown in FIGS. 9, 10, and 12, the interface between the connector 200, 200c and the mobile electronic device 100 on multiple non-parallel surfaces of the mobile electronic device 100 at the same time can be advantageous. For example, the non-parallel sides can be proximal/top and front (as shown), or can also be proximal/top and rear, proximal/top and left side, proximal/top and right side, or any other non-parallel sides. The non-parallel surfaces can include one or more surfaces that are at least partially within the mobile electronic device, such as port surface 111. When a connector 200 is mounted to a portion of a first side of a mobile electronic device 100 and contacts, extends over, and/or overlaps a portion of a second (e.g., non-parallel) side of a portion of the mobile electronic device 100, this arrangement can help to dissipate forces or resist movement, especially forces or movement that may otherwise be prone to push the connector 200 in a generally frontward or rearward direction.

Thus, when an intentional force is applied to either insert or withdraw the connector 200 from the port 110, which may sometimes involve an attempt by the user to wiggle the connector 200 laterally from side to side, or when an unintentional force is applied to the connector 200 at any angle or location, a wide base of support and/or a base of support that extends along a portion of multiple sides of the mobile electronic device 100, can help to dissipate this force, resisting the creation of a significant torque, twisting, moment arm, or bending that could otherwise cause damage to the connector 200 and/or mobile electronic device 100, including during attachment or detachment at the connection site. Also, rather than wiggling the connector 200 laterally from side to side or front to back, the user is urged by the shape and orientation of the connector 200 to attached or detach the connector 200 in a generally straight line, thereby avoiding damage.

Figure 13A:
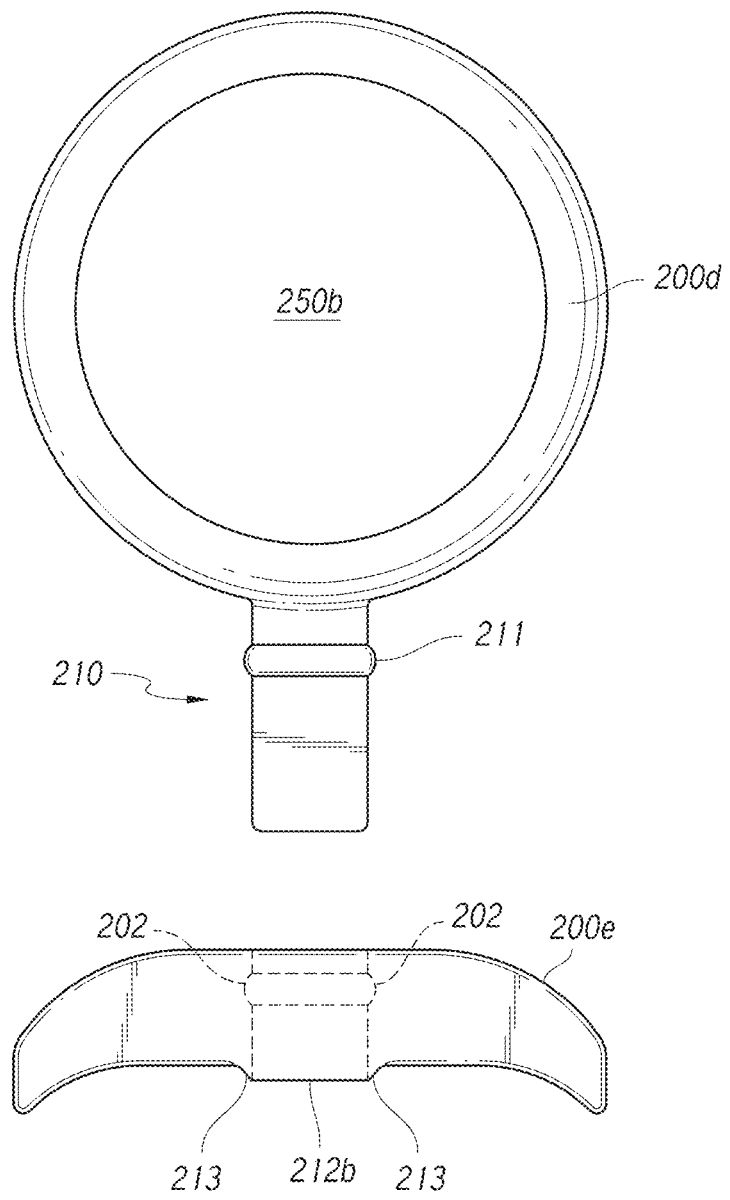
FIGS. 13A-B are illustrations of a front view of another connector.
Figure 13B:
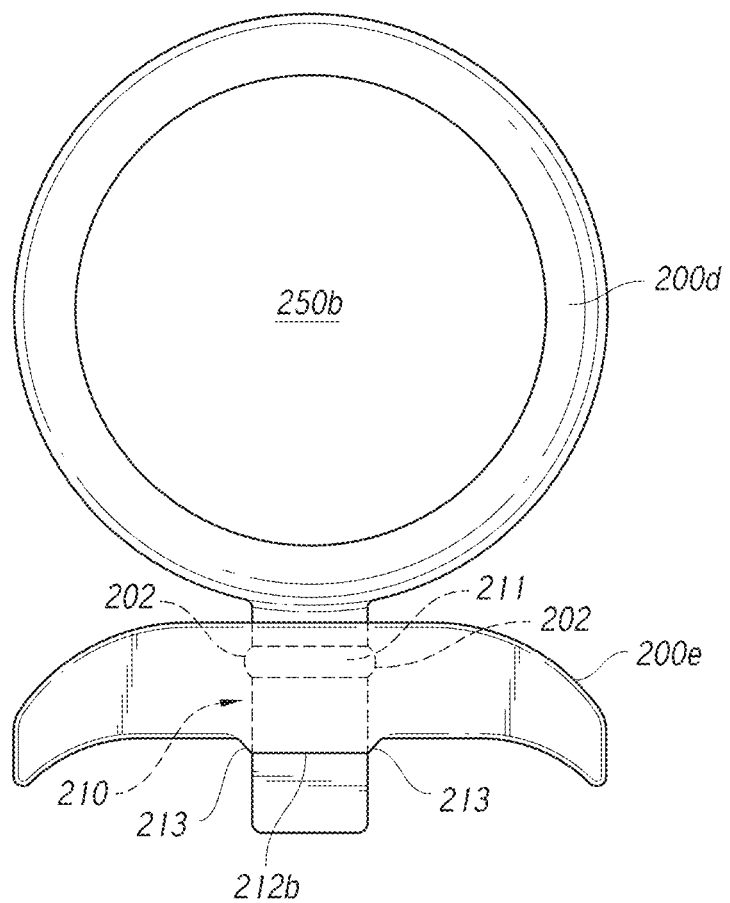
Figure 13C:
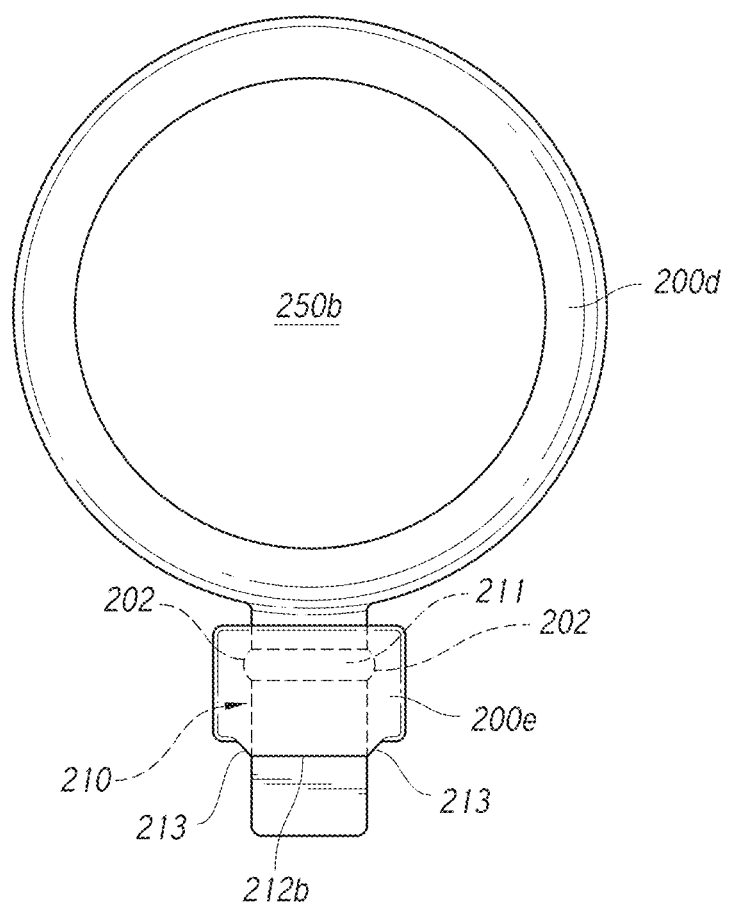
FIG. 13C is an illustration of a front view of another connector.

As illustrated in FIGS. 13A-C, in some embodiments, one or more (or any number) of parts or portions of the connector 200 can be modularly connectable and/or interchangeable to accommodate multiple different uses or circumstances. The parts can be provided in a kit or package. For example, different colors of the same modular parts of the connector 200 can be provided to allow the user to change all or portions of the color of the connector 200, such as when the connector 200 will be used on different types of mobile electronic devices 100 with different colors or with different clothing or personal carrying items of the user. In some embodiments, modular parts of the connector 200 can be removed and/or attached to make the connector compatible with different types of devices. For example, a modular cap may be connectable with a Lightning port-compatible protrusion 210 or alternatively connectable with a USB port-compatible protrusion 210. The connections can be accomplished by any suitable connection, such as one or more screw threads, snap-fits, friction fits, bayonet connectors, etc.

As shown in FIGS. 13A and 13B, two or more portions can be attachable to form the connector 200. For example, a first or proximal portion 200d of a connector 200 can be attachable to a second or distal portion 200e of a connector 200. One or both of the portions 200d, 200e can include or be used to form an access region 250b. A removable or permanent attachment structure can be provided to removably or permanently attach the two or more portions 200d, 200e to each other. For example, the attachment structure can comprise a projection on one of the portions 200d, 200e and a channel or recess on another of the portions 200d, 200e. As shown, a projection in the form of a raised ridge 211 can be provided on a proximal portion 200d, and a recess can be provided in the form of a channel 202 on the distal portion 200e, or vice versa. The protrusion 210 of the proximal portion 200d can be inserted into a proximal opening of the distal portion 200e, causing the projection to be forced into the opening until it reaches the recess, where it forms a friction fit to resist remove of the proximal and distal portions from each other.

Many different types of attachment structures can be used in addition to or instead of those illustrated here. For example, the first and second portions 200d, 200e can be attached in any suitable manner, including attachment structures that comprise one or more of ridges, bumps, asymmetrical projections, ramped or tapered projections, hooked projections, bulbous projections, projections with a catch or recess for engaging with a corresponding shape on the attaching portion, and/or square or angled projections, and/or attachment structures that comprise adhesive or glue, solvent attachments, rivets, screws, and/or sonic welding.

As illustrated in the example of FIGS. 13A and 13B, one of the portions 200d, 200e can comprise an abutment surface 213 to contact or engage with one or more internal surfaces on the mobile electronic device 100. As shown, the abutment surface 213, among other structures, can comprise a tapered, sloped, or chamfered surface with a distal edge 212b. The protrusion 210 can be configured to extend out distally beyond the distal end of distal edge 212b of the distal portion 200e a sufficient distance to be insertable into the port 110 on the mobile electronic device 100 and be securely retained therein until the user desires to remove it.

The abutment surface 213 can corresponds in size, shape, and/or orientation with another portion on the mobile electronic device 100, such as a portion within the port 110 of the mobile electronic device 100. The abutment surface 213 can provide stability and resistance to lateral movement or damage.

As shown in the example of FIGS. 13A and 13B, the proximal or underside of the distal portion 200e can be sized, shaped, and/or oriented to correspond to a proximal or top surface of the mobile electronic device 100 to which the connection 200 is configured to attach, which can provide additional resistance against movement or damage caused by lateral forces.

As shown in FIG. 13C, which can include any illustrated or described features of the embodiment of FIGS. 13A and 13B, one of the portions 200d, 200e can substantially narrower than the other of the portions 200d, 200e. In some embodiments, as shown, the distal portion 200e can be wide enough to be comfortably grippable with fingers, but sufficiently narrow that it may only contact the proximal or top surface (if at all) of the mobile electronic device 100, but not the front, rear, or sides of the mobile electronic device 100. Either or both of the portions 200d, 200e can be made of rigid material, such as plastic or metal, or can be made of flexible, compliant, or elastomeric material. As with all embodiments in this specification, any structure, material, function, method, or step that is described and/or illustrated in connection with the embodiments of FIGS. 13A-13C can be used by itself or with or instead of any structure, material, function, method or step that is described and/or illustrated in another example or used in this field.

In the embodiments illustrated, the connector 200 does not provide any electrical connection or communication between the mobile electronic device 100 and any other electrical component or source of electrical power. However, in some embodiments, the connector 200 and the protrusion 210 can include one or more electrical pathways that can be configured to provide electrical communication or power to the mobile electronic device 100 while the connector 200 is attached or coupled to the mobile electronic device 100. For example, the connector 200 can be connected or connectable in electrical communication with a power source (e.g., a battery or a plug-in charging cord) that is configured to charge the mobile electronic device 100 while attached; or the connector 200 can be provided on an electrical connecting end of any wire or other device configured to attach to a mobile electronic device 100, such as at the end of a Lightning wire or a USB wire or a USB-C wire or a speaker wire, or any other wire. In some embodiments, the connector 200 and/or protrusion 210 can include electronics, such as an electronic chip or printed circuit board (PCB) that is attached to or located within the connector 200 and/or protrusion 210 to perform one or more advantageous electronic functions, such as providing an external memory storage or an operating key, or any other desired electronic function.

In some uses of the device, a cover (not shown) can be provided over the combination of the connector 200 and the mobile electronic device 100 when attached or coupled to even more securely attach and/or protect these components. In some embodiments, the cover can be generally rigid (e.g., with a hinge or bendable portion) or the cover can be elastomeric, flexible, and/or resilient. For example, the cover can be configured to expand to stretch over the combination of some portion or substantially all of the connector 200 and the mobile electronic device 100 when attached or coupled to each other, and then tightly hold the components together, further resisting separation.

The following is claimed:

1. A connector comprising:
   a cap portion; and
   a protrusion extending distally from a bottom of the cap portion, the protrusion being configured to be attachable to an electronic port of a mobile electronic device;
   wherein the cap portion is configured to be sized and shaped so that, when the cap portion is attached to the mobile electronic device, the cap portion extends further in a distal direction along front and rear surfaces of the mobile electronic device or along a case enclosing the mobile electronic device than along a proximal edge of the mobile electronic device or of a case enclosing the mobile electronic device; and
   wherein the connector provides no electrical contact between the mobile electronic device and another device or structure.

2. A combination of the connector of claim 1 and the mobile electronic device.

3. The connector of claim 1, wherein the protrusion is made of metal.

4. The connector of claim 3, wherein the protrusion comprises a metal frame.

5. The connector of claim 4, wherein an interior of the metal frame comprises a plastic material.

6. The connector of claim 1, wherein a front-to-back thickness of the cap portion is configured to be about equal to a front-to-back thickness of the mobile electronic device to which the cap portion is configured to be attachable.

7. The connector of claim 1, wherein the cap portion comprises a curved distal surface that is configured to conform and snuggly contact a curved surface of the mobile electronic device to which the cap portion is configured to be attachable.

8. A kit for a connector comprising:
   a connector comprising a cap portion, a protrusion extending distally from a bottom of the cap portion, the protrusion being configured to be attachable to an electronic port of a mobile electronic device, wherein the cap portion is configured to be sized and shaped so that, when the cap portion is attached to the mobile electronic device, the cap portion extends further in a distal direction along front and rear surfaces of the mobile electronic device or along a case enclosing the mobile electronic device than along a proximal edge of the mobile electronic device or of a case enclosing the mobile electronic device; and
   an adhesive material to help maintain the connector on the mobile electronic device when the connector contacts the mobile electronic device.

9. The kit of claim 8 comprising a plurality of different types of adhesive materials that are configured to help maintain the connector on the mobile electronic device when the connector contacts the mobile electronic device.

10. A connector comprising:
    a cap portion; and
    a protrusion extending distally from a bottom of the cap portion, the protrusion being configured to be attachable to an electronic port of a mobile electronic device;
    wherein the cap portion is configured to be sized and shaped so that, when the cap portion is attached to the mobile electronic device, the cap portion extends further in a distal direction along front and rear surfaces of the mobile electronic device or along a case enclosing the mobile electronic device than along a proximal edge of the mobile electronic device or of the case enclosing the mobile electronic device; and
    wherein a high-friction surface is configured to increase an amount of force require to separate the connector from the mobile electronic device after attachment of the connector and the mobile electronic device.

11. A connector configured to be attachable to a mobile electronic device with a port and a proximal plane that contacts or is tangent to a proximal surface in which the port is located, the connector comprising:
    a cap; and
    a protrusion;
    wherein, when the connector is attached to the proximal surface of the mobile electronic device by inserting the protrusion into the port, the connector is sized and shaped such that at least a portion of the cap extends distally further than the proximal plane; and
    wherein the connector provides no electrical contact between the mobile electronic device and another device or structure.

12. A combination of the connector of claim 11 and the mobile electronic device.

13. A holding device configured to be attachable to an electronic port of a mobile electronic device, the electronic port being designed to receive an electronic connector, the holding device comprising:
    a cap; and
    a protrusion;
    wherein, the protrusion is configured to fit within the electronic port of the mobile electronic device such that a force required to remove the protrusion is at least about 5 times greater than a weight of the mobile electronic device;
    wherein the cap is configured to be sized and shaped so that, when the cap is attached to the mobile electronic device, the cap extends further in a distal direction along front and rear surfaces of the mobile electronic device or along a case enclosing the mobile electronic device than along a proximal edge of the mobile electronic device or of the case enclosing the mobile electronic device; and
    wherein the protrusion provides no electrical contact between the mobile electronic device and another device or structure.

14. The holding device of claim 13, wherein the force required to remove the protrusion is at least about 10 times greater than the weight of the mobile electronic device.

15. The holding device of claim 14, wherein the force required to remove the protrusion is at least about 15 times greater than the weight of the mobile electronic device.

\* \* \* \* \*